United States Patent
Colic et al.

(10) Patent No.: US 6,969,048 B2
(45) Date of Patent: Nov. 29, 2005

(54) VALVE ELEMENT FOR SUPPLEMENTARY CONTROL VALVE DEVICE

(75) Inventors: Rajko Colic, Bad Homburg (DE); Thomas Hannewald, Griesheim (DE); Thomas Mann, Nidderau-Windecken (DE); Herbert Severien, Linsengericht (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/024,674

(22) Filed: Dec. 30, 2004

(65) Prior Publication Data

US 2005/0151108 A1    Jul. 14, 2005

Related U.S. Application Data

(63) Continuation of application No. PCT/EP2004/050949, filed on May 27, 2004.

(51) Int. Cl.[7] ................................................ F15K 1/00
(52) U.S. Cl. ........................................ 251/357; 251/356
(58) Field of Search ................................ 251/356, 357; 137/542

(56) References Cited

U.S. PATENT DOCUMENTS

| | | | |
|---|---|---|---|
| 2,170,478 A | 8/1939 | Long | |
| 2,851,243 A * | 9/1958 | Tannock | 251/332 |
| 4,271,862 A | 6/1981 | Snoek | |
| 4,488,566 A | 12/1984 | Hicks | |
| 4,531,532 A * | 7/1985 | Zimmerly | 137/15.06 |
| 4,813,452 A | 3/1989 | Smith | |
| 4,930,539 A | 6/1990 | van Rooy | |
| 5,890,513 A * | 4/1999 | Di Stefano | 137/547 |
| 6,056,270 A * | 5/2000 | Zimmerly | 251/368 |
| 2004/0004205 A1 * | 1/2004 | Kuzniar | 251/357 |

FOREIGN PATENT DOCUMENTS

| | | |
|---|---|---|
| DE | 611 659 | 3/1935 |
| DE | 101 37 828 | 2/2003 |

OTHER PUBLICATIONS

Derwent Abstract—DE10137828, Auxiliary control valve for reciprocating piston engine air intake channel has valve element incorporated in flow body within widened section of intake channel, 2 pages.

* cited by examiner

Primary Examiner—J. Casimer Jacyna
(74) Attorney, Agent, or Firm—Jacob Eisenberg Siemens AG

(57) ABSTRACT

The valve element is composed of a valve stem, at one of whose ends a valve head is arranged, said valve head being of concave design in the direction of the valve stem, having on the outside a continuous annular region and having at least two cutouts between the annular region and the central connection point for connecting to the valve stem which are closed off by at least one closure part.

6 Claims, 3 Drawing Sheets

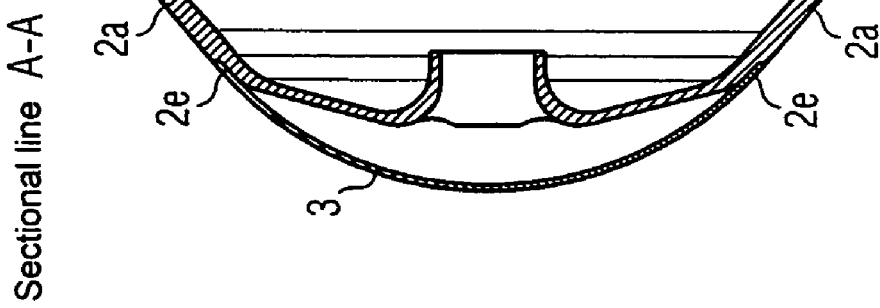
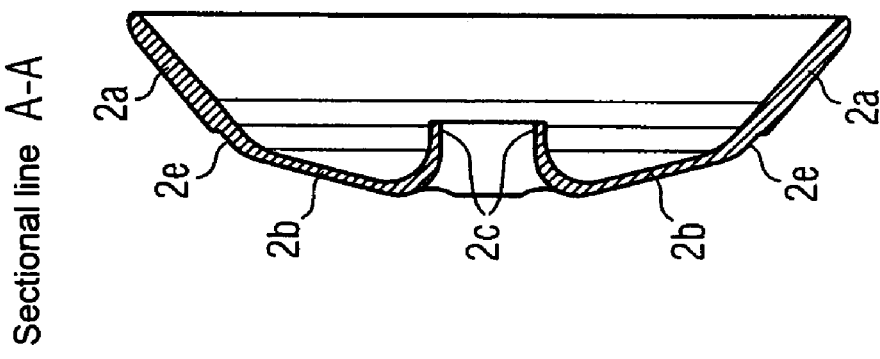
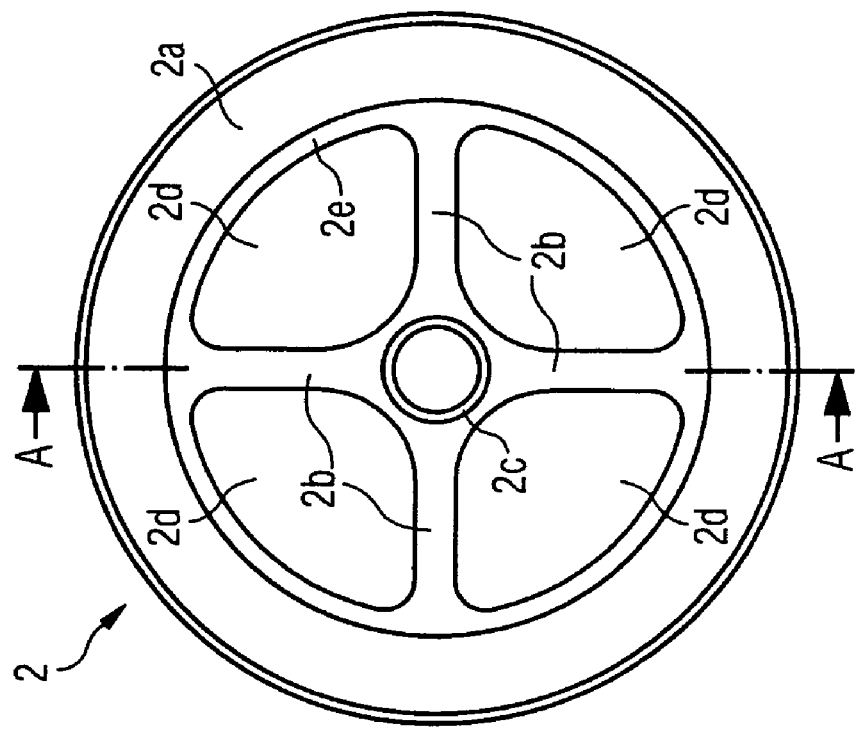

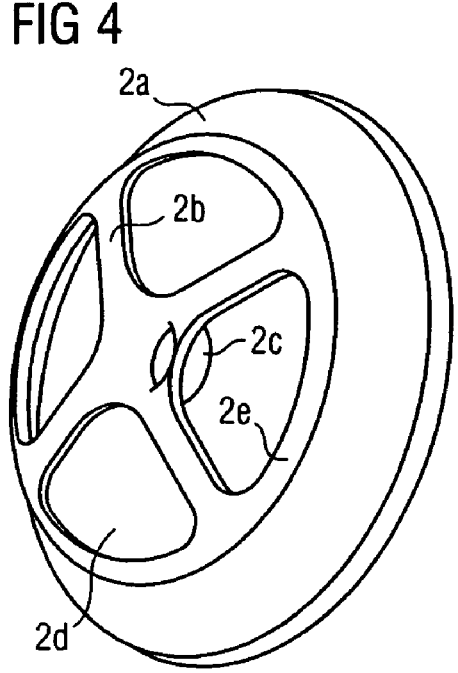
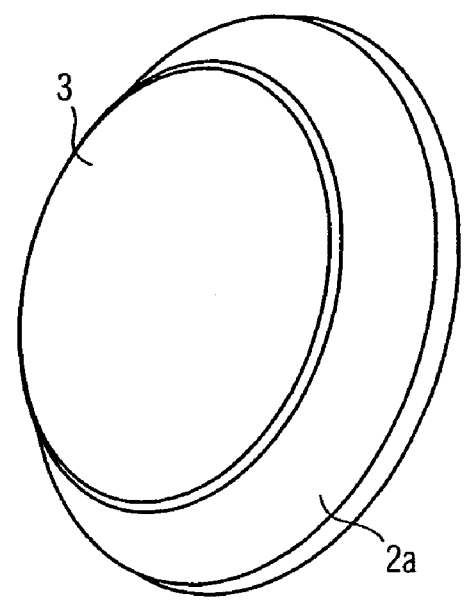
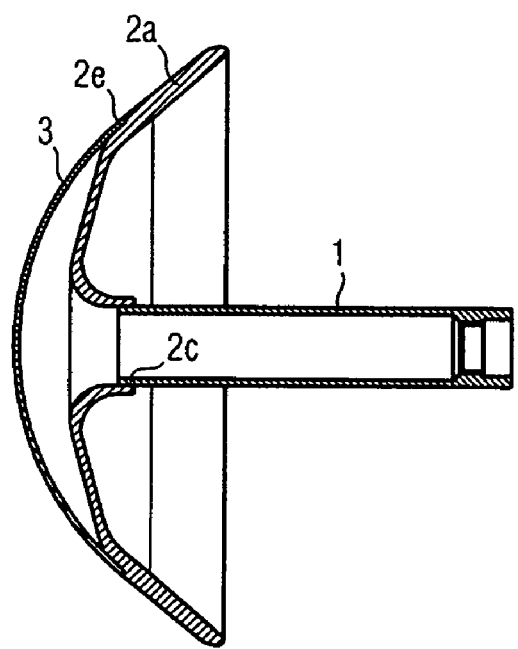
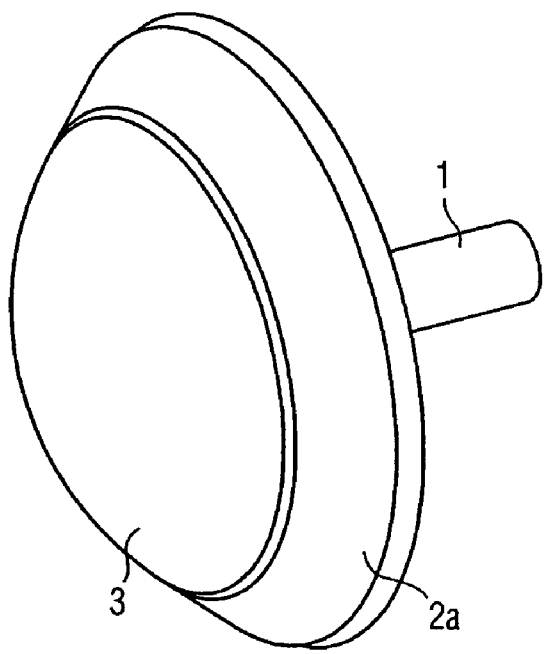

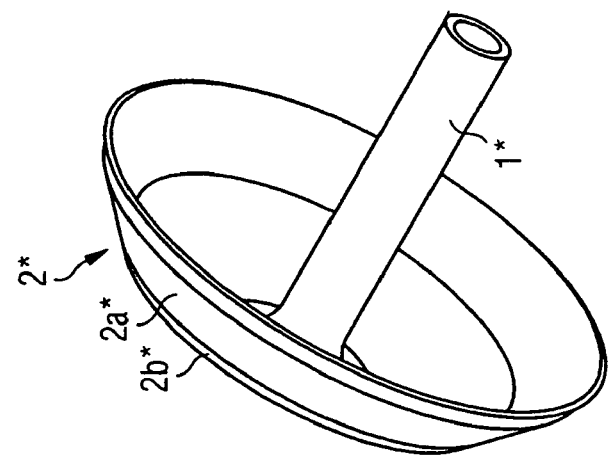
FIG 10
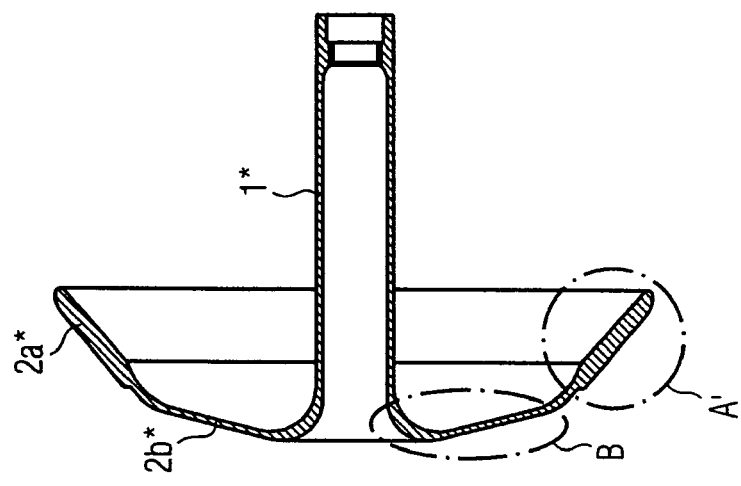
FIG 9 Sectional line A*-A*
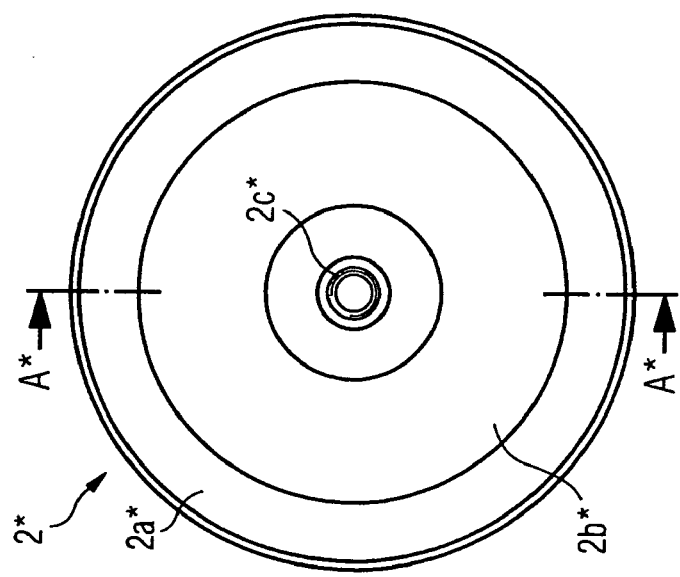
FIG 8

VALVE ELEMENT FOR SUPPLEMENTARY CONTROL VALVE DEVICE

CROSS REFERENCE TO RELATED APPLICATIONS

The present application is a continuation of international application PCT/EP2004/050949, filed May 27, 2004 and designated the United States, and further claims priority to German patent application 10327271.2, filed Jun. 17, 2003, the both of which are herein incorporated by reference.

BACKGROUND OF THE INVENTION

The invention relates to a valve element for a supplementary control valve device. Valve elements for supplementary control valve devices are known. DE 101 37 828 A1 describes a supplementary control valve device which is arranged in an inlet duct of a piston internal combustion engine. In this supplementary control valve device there is provision for a valve element to be arranged which is of essentially mushroom-shaped design. In this valve element, a hat-shaped head, which is designed so as to be convex with an apex point on the side facing away from the inlet valve, is arranged on a stem. The natural frequency of the system which is capable of vibrating is given by the spring constants and the weight of the valve element. The magnetic properties of the valve element are ensured, inter alia, by the profile of the wall thickness in the magnetically active region. It is not necessary here for the hat to be composed of magnetic material. However, with this valve element it is disadvantageous that relatively high tool forces are required in large-scale manufacture by cold extrusion, particularly in the region of the thin wall thicknesses which are necessary, which brings about relatively rapid wear of the tools.

SUMMARY OF THE INVENTION

The invention is therefore based on the object of providing a valve element for a supplementary control valve device which can be produced essentially by cold forming in large-scale manufacture, in which case relatively high tool forces can very largely be avoided. Furthermore, the intention is to achieve relatively short switching times with the valve element.

The object on which the invention is based is achieved by means of a valve element for a supplementary control valve device which is composed of a valve stem, at one of whose ends a valve head is arranged, said valve head being of concave design in the direction of the valve stem, having on the outside a continuous annular region and having at least two cutouts between the annular region and the central connection point for connecting to the valve stem which are closed off by at least one closure part. The supplementary control valve device is used for pulsed charging of spark ignition engines and diesel engines. The pulsed charging brings about an increase in the cylinder charge and thus increases the torque in the low and medium rotational speed ranges. The valve stem is generally of hollow and tubular design. The valve head is formed in the shape of a hat. The continuously annular region has, in a plan view, the shape of a circular ring and is used as an actual valve seat. It can be manufactured from a material which differs from the material which divides the at least two cutouts from one another. The connection point for connecting to the valve stem may be shaped in the form of a funnel, for example. However, other structural embodiments are also possible. For example, the valve head and the valve stem can also be manufactured as an individual part. The at least two cutouts are, for example, in the shape of semicircular areas. Depending on the application, up to thirty cutouts may be provided, and they are then designed in the form of slits. However, depending on the purpose of use it is also possible to use any other desired shapes of hole. The at least one closure part is generally composed of plastic or rubber. The at least two cutouts are closed by the at least one closure part by, for example, the at least two cutouts being filled by the at least one closure part in each case, or the at least one closure part being introduced in the form of a plastic insert into one cutout in each case.

It has been surprisingly found that in large-scale manufacture the valve element can be produced essentially by cold forming such as cold extrusion or deep drawing. Only the arrangement of the at least one closure part is carried out in a second step. In the case of cold extrusion, contrary to convention high tool forces can be avoided, which has an advantageous effect on the service life of the tools. Owing to the arrangement of the at least two cutouts, the valve element as a whole can be made lighter in weight so that shorter switching times can be achieved than is the case with valve heads which do not have any cutouts.

One preferred embodiment of the invention consists in the fact that four cutouts which are of the same shape and which are separated from each other by webs in each case are arranged. It is advantageous here that the desired mechanical strength values and the resilience of the valve head in the region of the four cutouts can be adjusted relatively easily by means of the geometry of the webs. For many purposes of use, a web width in the region of 3 to 5 mm, for example, has proven effective in this context. A relatively large degree of resilience can also be obtained if the webs have a width of 1 mm. In this case, it is also advantageous that the risk of rusting through is also reduced so that the mechanical strength is ensured over relatively long operating times.

According to a further preferred refinement of the invention, the valve head has a circumferential groove on the inner boundary of the annular region, and a single, one-part cap is arranged as a closure part in such a way that it engages with its outer boundary in the groove and its surface is flush with the surface of the annular region. The circumferential groove is in the shape of a depression, and in cross section is thus in the shape of a step. The one-part cap is formed from plastic and covers all the at least two cutouts and is thus closed off by a cover. It is arranged with its surface flush with another surface, which has an advantageous effect on the flow conditions in the supplementary control valve device. A stepped junction from the one-part cap to the annular region is thus not provided. In this advantageous way, the purely mechanical properties can be decoupled from the fluidic properties. By virtue of the respective design of the one-part cap it is possible to implement an optimum aerodynamic shape, virtually independently of the geometry of the valve head. By correspondingly changing the cap it is also possible to retrofit the valve element in an optimum way for other purposes of use. The cap can be attached to the valve head by means of a latched connection, for example.

A further embodiment of the invention provides for the cap which is arranged as a closure part to be connected to the valve head via a bonded connection. The bonding agent used here may be, for example, a two-component bonding agent such as the commercially available epoxy resin DP 460 or DP 760. It is advantageous here that the cap can be connected to the valve head with relative ease, while at the same time it is possible to dispense with the arrangement of eyelets or notches, which would be necessary, for example, for a latched connection.

BRIEF DESCRIPTION OF THE SEVERAL VIEWS OF THE DRAWINGS

The invention is explained in more detail below by way of example with reference the drawing (FIG. 1 to FIG. 10).

FIG. 1 is a plan view of a valve head,

FIG. 2 shows the valve head in cross section along the sectional line A—A in FIG. 1, FIG. 3 shows the valve head in cross section along the sectional line A—A in FIG. 1, additionally with a one-part cap which is arranged as a closure part, FIG. 4 shows the valve head without a one-part cap in a three-dimensional representation, FIG. 5 shows the valve head with a one-part cap in a three-dimensional representation, FIG. 6 shows the valve element in cross section with the valve stem, FIG. 7 shows the valve element according to FIG. 6 in a three-dimensional representation, FIG. 8 shows a plan view of a valve element according to the prior art, FIG. 9 shows a valve element according to the prior art in cross section along the sectional line A*—A* according to FIG. 8, and FIG. 10 shows a valve element according to the prior art in a three-dimensional form.

DETAILED DESCRIPTION OF THE INVENTION

FIG. 1 is a plan view of the valve head 2 of the valve element. The valve head 2 has a continuously annular region 2a on the outside. Said region 2a is in the form of a circular ring in a plan view. Four cutouts 2d, which are of the same shape, are arranged between the annular region 2a and a central connection point 2c for connecting to the valve stem (not illustrated). Said cutouts 2d are each separated from one another by webs 2b. For reasons of clarity the at least one closure part has not been represented. A circumferential groove 2e is arranged on the inner boundary of the annular region. Said groove 2e has the purpose of securing the closure part (not illustrated).

FIG. 2 illustrates the valve head in cross section along the sectional line A—A in FIG. 1. The groove 2e is in the shape of a depression and is embodied in the form of a step in cross section.

FIG. 3 illustrates the valve head once more in cross section in a way which is analogous to FIG. 2, but additionally with a single, one-part cap which is arranged as a closure part 3. The one-part cap is arranged in such a way that it engages with its outer boundary in the groove 2e and its surface is flush with the surface of the annular region 2a. Depending on the embodiment of the cap, it is possible to optimize flow conditions in the interior of the supplementary control valve device (not illustrated). Furthermore, it is advantageously possible, by selecting the shape of the plastic cap, to minimize the undesired noise which normally occurs during operation of the supplementary control valve device. The cap which is arranged as a closure part 3 is particularly advantageously connected to the valve head 2 by means of a bonded connection.

FIG. 4 is a three-dimensional illustration of the valve head without closure part.

FIG. 5 is a three-dimensional illustration of the valve head according to FIG. 4 with the cap arranged as a closure part 3.

FIG. 6 illustrates the valve element in cross section, the arrangement of the valve stem 1 being additionally illustrated in comparison to FIG. 3. The valve head is of concave design in the direction of the valve stem 1. The valve stem 1 engages in the valve head at the connection point 2c, and the valve stem 1 and the valve head can also be manufactured as individual parts.

FIG. 7 is a three-dimensional illustration of the valve element according to FIG. 6.

FIG. 8 is a plan view of a valve head 2* of a valve element according to the prior art. The valve head 2* has been turned as a single part made of solid material together with the valve stem (not illustrated). The valve cover 2* has a continuously annular region 2a* and an internal region 2b* on the outside. A connection point 2c*, to which the valve stem (not illustrated) can be connected to the valve head 2* is provided in the centre.

FIG. 9 illustrates the valve element according to the prior art in cross section along the sectional line A*—A* according to FIG. 8. The valve head and the valve stem 1* are manufactured here as individual parts. The continuously annular region 2a* serves as an actual valve seat, while the inner region 2b* has to have the necessary resilience. In the first zone A', which is to be assigned to the continuously annular region 2a*, the wall thickness is significantly thicker than in the second zone B which is to be assigned to the inner region 2b*. Owing to these relatively pronounced junctions in the wall thickness region, considerable disadvantages occur in large-scale manufacture using a cold extrusion process since the thinning of the valve head in the region of the second zone B requires unconventionally high tool forces which entail a relatively large amount of wear of the tools. In the valve element according to the invention, such necessary considerable differences in the wall thickness do not occur in the valve head, with the result that the tool wear occurring with large-scale manufacture using the cold extrusion process can thus be avoided.

FIG. 10 is a three-dimensional illustration of the valve element according to the prior art in FIG. 9.

We claim:

1. A valve element for a supplementary control valve device, comprising:
    a valve stems having a plurality of ends and
    a valve head arranged at one of said ends, said valve head having a concave design in a direction of said valve stem, a continuous annular region on an outside of said valve head, and at least two cutouts between the annular region and a central connection point for connecting to said valve stem, the cutouts being closed off by at least one closure part.

2. The valve element according to claim 1, further comprising four cutouts comprising a substantially same shape and separated from each other by webs.

3. The valve element according to claim 1, wherein said valve head has a circumferential groove on an inner boundary of said annular region, and in which a single, one-part cap is arranged as a closure part in such a way that it engages with its outer boundary in a groove and its surface is flush with a surface of said annular region.

4. The valve element according to claim 3, wherein said cap is connected to said valve head via a bonded connection.

5. The valve element according to claim 2, wherein said valve head has a circumferential groove on an inner boundary of said annular region, and in which a single, one-part cap is arranged as a closure part in such a way that it engages with its outer boundary in a groove and its surface is flush with a surface of said annular region.

6. The valve element according to claim 3, wherein said cap is connected to said valve head via a bonded connection.

* * * * *

UNITED STATES PATENT AND TRADEMARK OFFICE
CERTIFICATE OF CORRECTION

| | | |
|---|---|---|
| PATENT NO. | : 6,969,048 B2 | Page 1 of 1 |
| APPLICATION NO. | : 11/024674 | |
| DATED | : November 29, 2005 | |
| INVENTOR(S) | : Colic et al. | |

It is certified that error appears in the above-identified patent and that said Letters Patent is hereby corrected as shown below:

Item 30

Please insert

June 17, 2003 (DE) ................... 10327271.2

Signed and Sealed this

Seventeenth Day of April, 2007

JON W. DUDAS
*Director of the United States Patent and Trademark Office*